(12) United States Patent
Nonoyama et al.

(10) Patent No.: US 10,483,560 B2
(45) Date of Patent: Nov. 19, 2019

(54) SINGLE CELL OF FUEL CELL

(71) Applicant: TOYOTA JIDOSHA KABUSHIKI KAISHA, Toyota-shi, Aichi-ken (JP)

(72) Inventors: Nobuaki Nonoyama, Chiryu (JP); Masaya Kobayashi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 99 days.

(21) Appl. No.: 15/794,307

(22) Filed: Oct. 26, 2017

(65) Prior Publication Data
US 2018/0131013 A1    May 10, 2018

(30) Foreign Application Priority Data
Nov. 9, 2016 (JP) .................... 2016-218830

(51) Int. Cl.
| | | |
|---|---|---|
| *H01M 8/026* | (2016.01) | |
| *H01M 8/1007* | (2016.01) | |
| *H01M 8/1004* | (2016.01) | |
| *H01M 8/0263* | (2016.01) | |
| *H01M 8/0273* | (2016.01) | |
| *H01M 8/1018* | (2016.01) | |

(52) U.S. Cl.
CPC .......... *H01M 8/026* (2013.01); *H01M 8/0263* (2013.01); *H01M 8/1004* (2013.01); *H01M 8/1007* (2016.02); *H01M 8/0273* (2013.01); *H01M 2008/1095* (2013.01)

(58) Field of Classification Search
CPC ................ H01M 8/026; H01M 8/0258
See application file for complete search history.

(56) References Cited

U.S. PATENT DOCUMENTS

| | | |
|---|---|---|
| 2003/0215695 A1 | 11/2003 | Suzuki et al. |
| 2005/0064263 A1 | 3/2005 | Goebel et al. |
| 2015/0079495 A1* | 3/2015 | Iritsuki ............... H01M 8/0232 429/481 |

FOREIGN PATENT DOCUMENTS

| | | |
|---|---|---|
| JP | 2003-338300 | 11/2003 |
| JP | 2004-158435 | 6/2004 |
| JP | 2010-251068 | 11/2010 |
| JP | 2011-119061 | 6/2011 |
| JP | 2014-26822 | 2/2014 |
| JP | 2015-22802 | 2/2015 |

* cited by examiner

*Primary Examiner* — Olatunji A Godo
(74) *Attorney, Agent, or Firm* — Finnegan, Henderson, Farabow, Garrett & Dunner, LLP

(57) ABSTRACT

A single cell of a fuel cell has: a membrane-electrode assembly; and first and second separators holding the membrane-electrode assembly therebetween. The first separator has plural first straight or wavy groove channels that are arranged in parallel to each other in a first in-plane direction. A cross section along the first in-plane direction of each of the plural first groove channels has a first uneven shape. The first uneven shape has a first pitch P1 along the first in-plane direction. The second separator has plural second wavy groove channels that are aligned along the first in-plane direction. A second uneven shape of the plural second groove channels has a second pitch P2 along the first in-plane direction. The first pitch P1 and the second pitch P2 differ from each other, and neither a value of P1/P2 nor a value of P2/P1 is an integer.

7 Claims, 16 Drawing Sheets

SINGLE CELL OF FUEL CELL

INCORPORATION BY REFERENCE

The disclosure of Japanese Patent Application No. 2016-218830 filed on Nov. 9, 2016 including the specification, drawings and abstract is incorporated herein by reference in its entirety.

BACKGROUND

1. Technical Field

The disclosure relates to a single cell of a fuel cell that constitutes a stack, in particular, to a structure of a groove channel in a separator that is included in the single cell of the fuel cell.

2. Description of Related Art

A structure of a single cell of a fuel cell is disclosed in Japanese Patent Application Publication No. 2011-119061 (JP 2011-119061 A). In the single cell, a wavy groove channel for reaction gas is formed in each of a separator provided on one electrode side and a separator provided on the other electrode side in an electrolyte/electrode structural body (a membrane-electrode assembly).

SUMMARY

When the plural fuel cells described above are stacked to constitute a fuel cell stack, in a separator of the single cell of one of the adjacent fuel cells and the separator of the single cell of the other adjacent fuel cell, it is structured that a load applied in a stacked direction is supported by entire contact surfaces of projected surfaces on an opposite side that correspond to recessed surfaces of groove channels for the reaction gas.

However, in the cases where positions of the single cells of the adjacent fuel cells are misaligned in an in-plane direction of the single cell of the fuel cell and positions of the adjacent separators are thereby misaligned, uneven distribution of the contact surfaces of the separators and a reduction in an area of the contact surfaces occur, and distribution of the region where the load is supported is changed. Consequently, such a problem that structures of the fuel cell stack and the single cell of the fuel cell become unstable occurs. In addition, a difference between distribution of a load applied to the membrane-electrode assembly from one of the separators holding the membrane-electrode assembly and distribution of a load applied to the membrane-electrode assembly from the other separator is increased, and the load is unevenly applied to one of the surfaces of the membrane-electrode assembly. Thus, such a problem that the membrane-electrode assembly is possibly damaged occurs.

The disclosure relates to a single cell of a fuel cell having: a membrane-electrode assembly; and first and second separators holding the membrane-electrode assembly therebetween. The first separator has plural first groove channels that are straight or wavy and that are arranged in parallel to each other in a first in-plane direction. A cross section along the first in-plane direction of each of the plural first groove channels has a first uneven shape. The first uneven shape has a first pitch P1 along the first in-plane direction. The second separator has plural second groove channels that are wavy and that are aligned along the first in-plane direction. A cross section along the first in-plane direction of each of the plural second groove channels has a second uneven shape. The second uneven shape has a second pitch P2 along the first in-plane direction. The first pitch P1 and the second pitch P2 differ from each other, and neither a value of P1/P2 nor a value of P2/P1 is an integer. According to the single cell of the fuel cell in this aspect, even in the cases where positions of the adjacent single cells of the fuel cell are misaligned in the in-plane direction of the single cells of the fuel cell and positions of the adjacent separators are thereby misaligned during stacking of the single cells of the fuel cell, uneven distribution of contact surfaces of the separators can be suppressed, and a reduction in an area of the contact surfaces can be suppressed, and structures of a fuel cell stack and the single cell of the fuel cell can be suppressed from becoming unstable.

The plural first groove channels and the plural second groove channels may be formed in a region opposing the membrane-electrode assembly. According to the single cell of the fuel cell in this aspect, a difference between distribution of a load applied to the membrane-electrode assembly from one of the separators holding the membrane-electrode assembly and distribution of a load applied to the membrane-electrode assembly from the other separator can be suppressed, uneven application of the load to one surface of the membrane-electrode assembly can be suppressed, and damage to the membrane-electrode assembly can be suppressed.

The first pitch P1 and the second pitch P2 may satisfy $1 < P1/P2 < 3/2$ or $1 < P2/P1 < 3/2$. With such a configuration, in the case where the positions of the adjacent single cells of the fuel cell are misaligned in the in-plane direction of the single cells of the fuel cell during stacking of the single cells of the fuel cell, the misalignment of the contact surfaces of the separators in a misaligned direction can be reduced. Accordingly, uneven distribution of the contact surfaces of the separators can further efficiently be suppressed, the reduction in the area of the contact surfaces can be suppressed, and the structures of the fuel cell stack and the single cells of the fuel cell can be suppressed from becoming unstable.

Each of the plural first groove channels may be a straight groove channel. In this way, for example, the first groove channel that is used to supply the reaction gas with a higher flow rate of two types of the reaction gas supplied to the membrane-electrode assembly is configured as the straight groove channel, thereby m increase in pressure loss of the reaction gas can be suppressed, and degradation of power generation capacity of the fuel cell can be reduced.

In a case where width of a flat section of a first projection on a back side of the first groove channel is set as D1, an amplitude of a wavy shape of a second projection on a beck side of the second groove channel is set as Aw, and width of a flat section of the second projection is set as D2, the amplitude Aw may be set to satisfy a relationship expressed by an equation (1) below.

$$2 \cdot P1 - (D1 + D2) < Aw < 4 \cdot P1 - (D1 + D2) \qquad (1)$$

With such a configuration, the amplitude Aw of the second groove channel is set to satisfy a relationship expressed by the above equation (1). In this way, the structures of the fuel cell stack and the single cells of the fuel cell can be suppressed from becoming unstable by the misalignment of the stack, the increase in the pressure loss of the reaction gas flowing through the second groove channel can be suppressed, and the degradation of the power generation capacity of the fuel cell can be reduced.

The first groove channel of the first separator may be a channel used to supply oxidation gas to a cathode of the membrane-electrode assembly, and the second grove channel of the second separator may be a channel used to supply fuel gas to an anode of the membrane-electrode assembly. With such a configuration, the first groove channel as the straight groove channel is used as the channel for the oxidation gas whose supply flow rate is higher than that of the fuel gas. Accordingly, the pressure loss of the reaction gas can be reduced, and the power generation efficiency of the fuel cell can be improved.

Note that the disclosure can be realized in various aspects. For example, in addition to the single cell of the fuel cell, the disclosure can be realized in aspects of a fuel cell stack in which the single cells of the fuel cell are stacked, and the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. Embodiments

Figure 1:
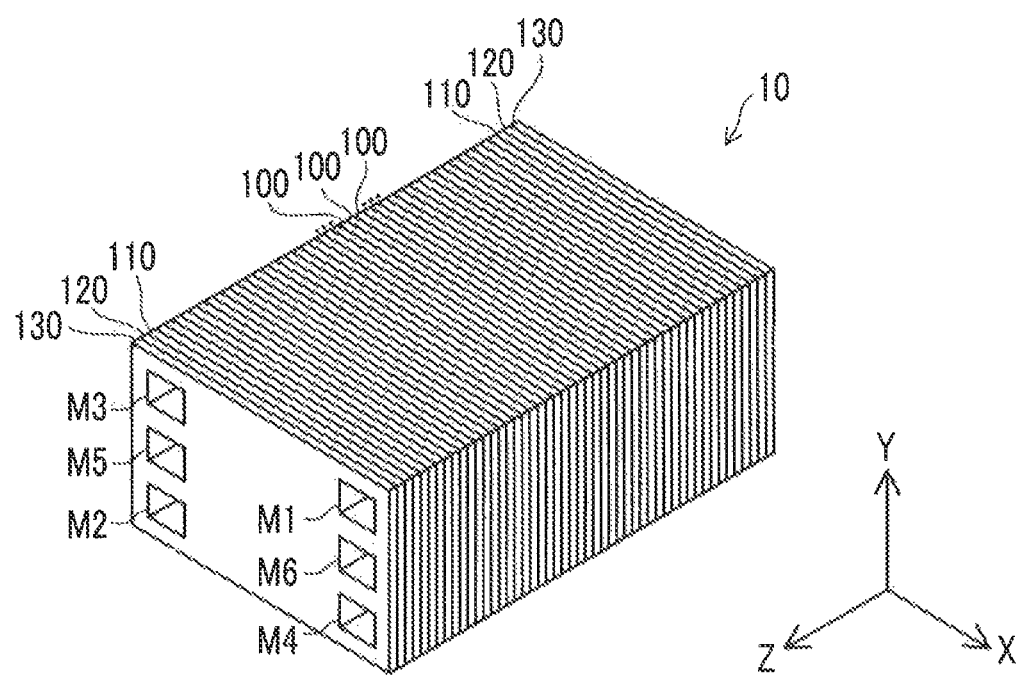
FIG. 1 is a view that schematically illustrates external appearance of a fuel cell stack.

FIG. 1 is a view that schematically illustrates external appearance of a fuel cell stack 10. In FIG. 1, an X-direction is a longitudinal direction of a fuel cell 100, a Y-direction is a short direction thereof, and a Z-direction is a stacked direction thereof. The same applies to the other drawings.

The fuel cell stack 10 includes "single cells" (will also be simply referred to as "fuel cells") 100 of the fuel cell, terminal plates 110, insulation plates 120, and end plates 130. The plural fuel cells 100 are provided, are stacked in the Z-direction, and constitute a stack. The terminal plates 110 are respectively arranged on both sides of the plural stacked fuel cells 100 and are used to take out a voltage and a current from the fuel cells 100. The insulation plates 120 are respectively arranged on outer sides of the terminal plates 110. The end plates 130 are respectively arranged on both sides of the fuel cell stack 10 to fasten the stacked fuel cells 100, the terminal plates 110, and the insulation plates 120.

Each of the fuel cells 100, the terminal plates 110, the insulation plates 120, and the end plates 130 has plural openings. The openings provided in each of the components respectively communicate with the openings provided in the others to form manifolds M1 to M6. Because being used to supply fuel gas to anodes of the fuel cells 100, the manifold M1 is also referred to as a fuel gas supply manifold M1. Hereinafter, due to their roles, the manifolds M2 to M6 will also be respectively referred to as a "fuel gas discharge manifold M2", an "oxidation gas supply manifold M3", an "oxidation gas discharge manifold M4", a "refrigerant supply manifold M5", and a "refrigerant discharge manifold M6".

Figure 2:
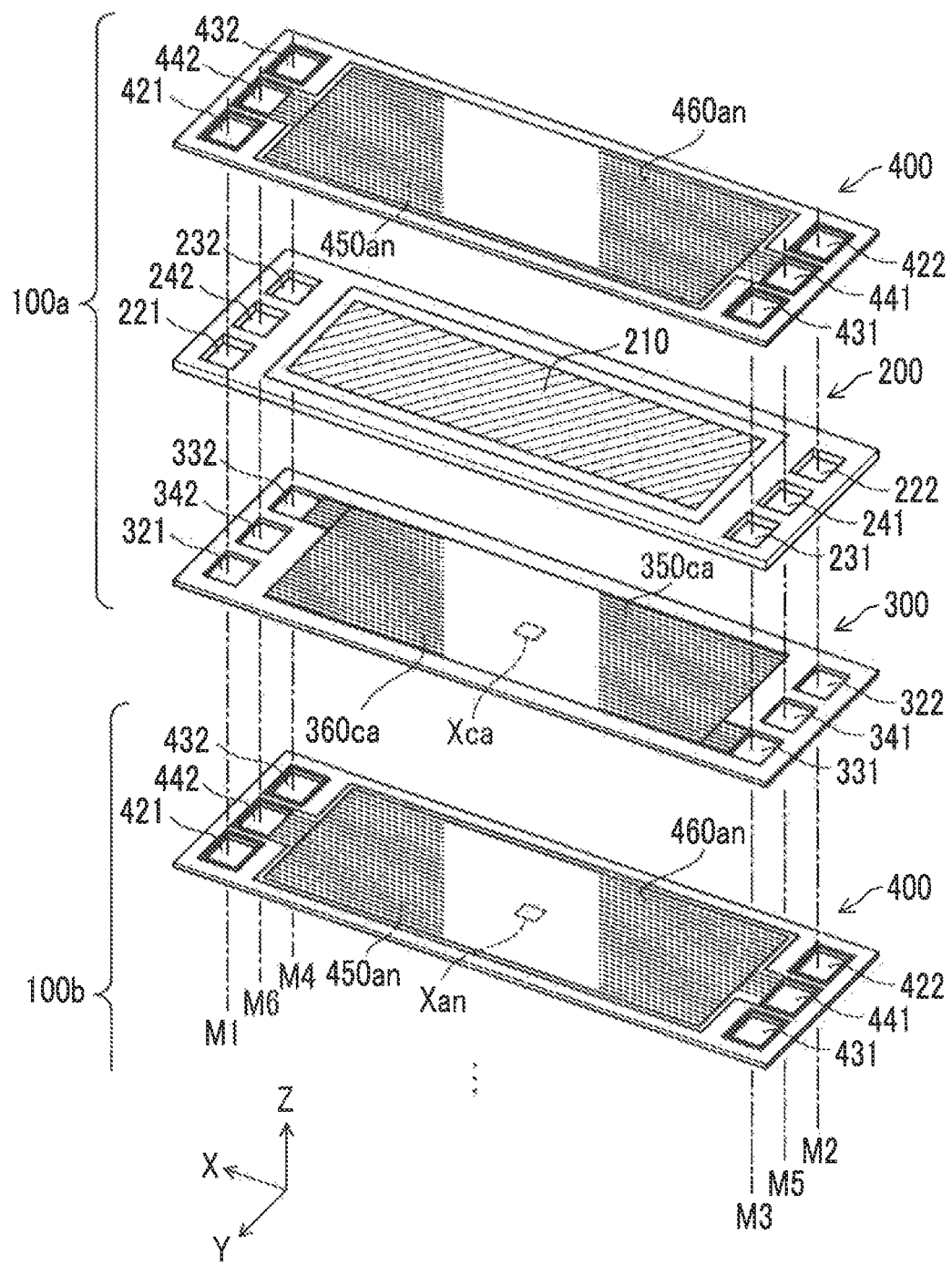
FIG. 2 is a schematic exploded perspective view of two single cells that are adjacent to each other.

FIG. 2 is a schematic exploded perspective view of two adjacent single cells 100a, 100b of the plural single cells 100, which constitute the fuel cell stack 10 in FIG. 1. However, only a separator 400 that is adjacent to the single cell 100s is shown for the single cell 100b, and the other components thereof are not shown.

The single cells 100s, 100b each include: a resin frame 200 that accommodates a membrane-electrode assembly 210 as a power generation body, and the paired separators 300, 400 that hold the membrane-electrode assembly 210 therebetween. The membrane-electrode assembly (MEA) 210 includes a catalyst coated membrane (CCM) and gas diffusion layers that are respectively provided on both surfaces of the CCM. The CCM includes an electrolyte membrane and catalytic layers that are respectively provided on both surfaces of the electrolyte membrane. The electrolyte membrane is a polyelectrolyte membrane formed of fluorine-based sulfonic acid polymer as a solid polymeric material and has favorable proton conductivity in a wet state. As the electrolyte membrane, instead of a fluorine-based sulfonic acid membrane, a fluorine-based phosphonic acid membrane, a fluorine-based carboxylic acid membrane, or the like may be used. The catalytic layers are each configured by including: a catalyst carrier (for example, carbon particles) carrying catalytic metal (for example, platinum) in which electrochemical reaction proceeds; and a polyelectrolyte (for example, a fluorine-based resin) having the proton conductivity. As the catalyst carrier, instead of the carbon particles of carbon black or the like, a carbon material, such as carbon nanotube and carbon nanofiber, a carbon compound having silicon carbide and the like as representative examples, or the like may be used. In addition, as the catalytic metal, instead of platinum, a platinum alloy, palladium, rhodium, or the like may be used, for example. The gas diffusion layers are each formed of a member with electrical conductivity such as carbon paper, unwoven carbon cloth, a metallic porous body, or expand metal. The catalytic layers and the gas diffusion layers on both surfaces of the electrolyte membrane constitute electrodes (a cathode and an anode) of the membrane-electrode assembly 210.

The resin frame 200 is located between the paired separators 300, 400, thereby prevents short-circuit of the separators 300, 400, and also prevents leakage of reaction gas (the fuel gas, oxidation gas) that passes through the single cell 100 and a cooling medium to the outside. The resin frame 200 is formed by using a resin such as polypropylene, a phenolic resin, or an epoxy resin.

The resin frame 200 has a rectangular outer shape and accommodates the membrane-electrode assembly 210 in an opening at a center. Through holes 221, 222, 231, 232, 241, 242, each of which constitutes a part of the manifold, are formed around the membrane-electrode assembly 210 in the resin frame 200. More specifically, the through hole 221 constitutes a part of the fuel gas supply manifold M1, through which the fuel gas (hydrogen gas) supplied from the outside flows into each of the single cells 100, and the through hole 222 constitutes a part of the fuel gas discharge manifold M2, through which discharged gas of the fuel gas (hereinafter will also be referred to as the "discharged fuel gas") discharged from each of the single cells 100 flows to the outside. The through hole 231 constitutes a part of the oxidation gas supply manifold M3, through which the oxidation gas (air) supplied from the outside flows into each of the single cells 100, and the through hole 232 constitutes a part of the oxidation gas discharge manifold M4, through which discharged gas of the oxidation gas (hereinafter will also be referred to as the "discharged oxidation gas") discharged from each of the single cells 100 flows to the outside. The through hole 241 constitutes a part of the refrigerant supply manifold M5, through which the cooling medium supplied from the outside flows into each of the single cells 100, and the through hole 242 constitutes a part of the refrigerant discharge manifold M6, through which the discharged cooling medium flows.

The paired separators 300, 400 are arranged to hold the resin frame 200, which accommodates the membrane-electrode assembly 210, from both of the sides and are each adhered to the resin frame 200 by a sealing agent. The one separator 300 is arranged on the cathode side of the membrane-electrode assembly 210, and the other separator 400 is arranged on the anode side of the membrane-electrode assembly 210. Hereinafter, the separator 300 will also be referred to as a "first separator 300", and the separator 400 will also be referred to as a "second separator 400".

The separators 300, 400 are each constructed of a member with a gas barrier property and electron conductivity. The separators 300, 400 are each formed of a metal member such as pressed titanium or stainless steel.

The separators 300, 400 are respectively formed of through holes 321, 322, 331, 332, 341, 342, 421, 422, 431, 432, 441, 442, each of which constitutes a part of the manifold. These through holes 321, 322, 331, 332, 341, 342, 421, 422, 431, 432, 441, 442 respectively correspond to the through holes 221, 222, 231, 232, 241, 242 of the resin frame 200. That is, the through holes 321, 322, 331, 332, 341, 342, 421, 422, 431, 432, 441, 442 formed in the separators 300, 400 respectively communicate with the through holes 221, 222, 231, 232, 241, 242 formed in the resin frame 200 along a stacked direction of the first separator 300, the resin frame 200, and the separator 400 on the anode side in the Z-direction (hereinafter will also simply be referred to as the "stacked direction") and thereby constitute the manifolds M1 to M6 for supplying the fuel gas, discharging the fuel gas, supplying the oxidation gas, discharging the oxidation gas, supplying the cooling medium, and discharging the cooling medium.

Of surfaces of the first separator 300, a surface (an upper surface in the drawing) that opposes the membrane-electrode assembly 210 is formed with a groove channel 350*ca* for the oxidation gas (hereinafter will also be referred to as the "first groove channel 350*ca*"). The first groove channel 350*ca* communicates with the manifolds M3, M4, supplies the oxidation gas flowing through the manifold M3 to the cathode of the membrane-electrode assembly 210, and causes the discharged oxidation gas that has flowed through the membrane-electrode assembly 210 to flow into the manifold M4. Of the surfaces of the first separator 300, a surface that is located opposite from the side where the membrane-electrode assembly 210 is located is formed with a groove channel 360*ca* for the cooling medium (hereinafter will also be referred to as the "refrigerant groove channel 360*ca*"). The refrigerant groove channel 360*ca* communicates with the manifolds M5, M6, and the cooling medium flows therethrough.

Of both surfaces of the second separator 400, a surface that opposes the membrane-electrode assembly 210 is formed with a groove channel 450*an* for the fuel gas (hereinafter will also be referred to as the "second groove channel 450*an*"). The second groove channel 450*an* communicates with the manifolds M1, M2, supplies the fuel gas flowing through the manifold M1 to the anode of the membrane-electrode assembly 210, and causes the discharged fuel gas that has flowed through the membrane-electrode assembly 210 to flow to the manifold M2. Of the surfaces of the second separator 400, the surface that is located opposite from the side where the membrane-electrode assembly 210 is located is formed with a groove channel 460*an* for the cooling medium (hereinafter will also be referred to as the "refrigerant groove channel 460*an*"). The refrigerant groove channel 460*an* communicates with the manifolds M5, M6, and the cooling medium flows therethrough.

Note that a projection and a recess of the first groove channel 350*ca* in the first separator 300 and a projection and a recess of the refrigerant groove channel 360*ca* therein establish a relationship of two sides of the same coin. That is, grooves of the first groove channel 350*ca* correspond to the recesses on a back side of ribs (projections), two each of which hold a groove of the refrigerant groove channel 360*ca* therebetween, and ribs, two each of which hold the groove of the first groove channel 350*ca* therebetween, correspond to projections on a back side of the grooves of the refrigerant groove channel 360*ca*. In other words, an apex (a flat section) of the rib is formed on an opposite surface from the surface on the side where the first groove channel 350*ca* of the first separator 300 is provided, and the apex of the rib opposes a bottom of the first groove channel 350*ca*. Similarly, a projection and a recess of the second grove channel 450*an* in the second separator 400 and a projection and a recess of the refrigerant groove channel 460*an* therein establish a relationship of two sides of the same coin. That is, grooves of the second groove channel 450*n* correspond to the recesses on a back side of ribs, two each of which hold a groove of the refrigerant groove channel 460*n* therebetween and ribs, two each of which hold the groove of the second groove channel 450*an* therebetween, correspond to projections on a back side of the grooves of the refrigerant groove channel 460*an*.

When the flat section (the apex) of the rib of the first groove channel 350*ca* contacts the cathode of the membrane-electrode assembly 210, electrical connection between the first separator 300 and the cathode of the membrane-electrode assembly 210 is secured. In addition, when a flat section (an apex) of the rib of the groove channel 450*an* for the fuel gas in the second separator 400 contacts the anode of the membrane-electrode assembly 210, the electrical connection between the second separator 400 and the anode of the membrane-electrode assembly 210 is secured. In this way, the single cells 100 (100*a*, 100*b*) having a structure, in each of which the paired separators 300, 400 hold the resin frame 200, which accommodates the membrane-electrode assembly 210, therebetween and are integrated, are configured. Furthermore, the flat section of the rib of the refrigerant groove channel 360*ca*, which corresponds to the groove of the first groove channel 350*ca* in the first separator 300 of the one adjacent single cell 100, contacts the flat section of the rib of the refrigerant groove channel 460*an*, which corresponds to the groove of the second groove channel 450*n* in the second separator 400 of the other adjacent single cell 100*b*. In this way, electrical connection and structural contact of the adjacent single cells 100*a*, 100*b* are secured. In this way, the fuel cell stack 10, in which the plural single cells 100 are stacked and integrated, is configured.

Figure 3:
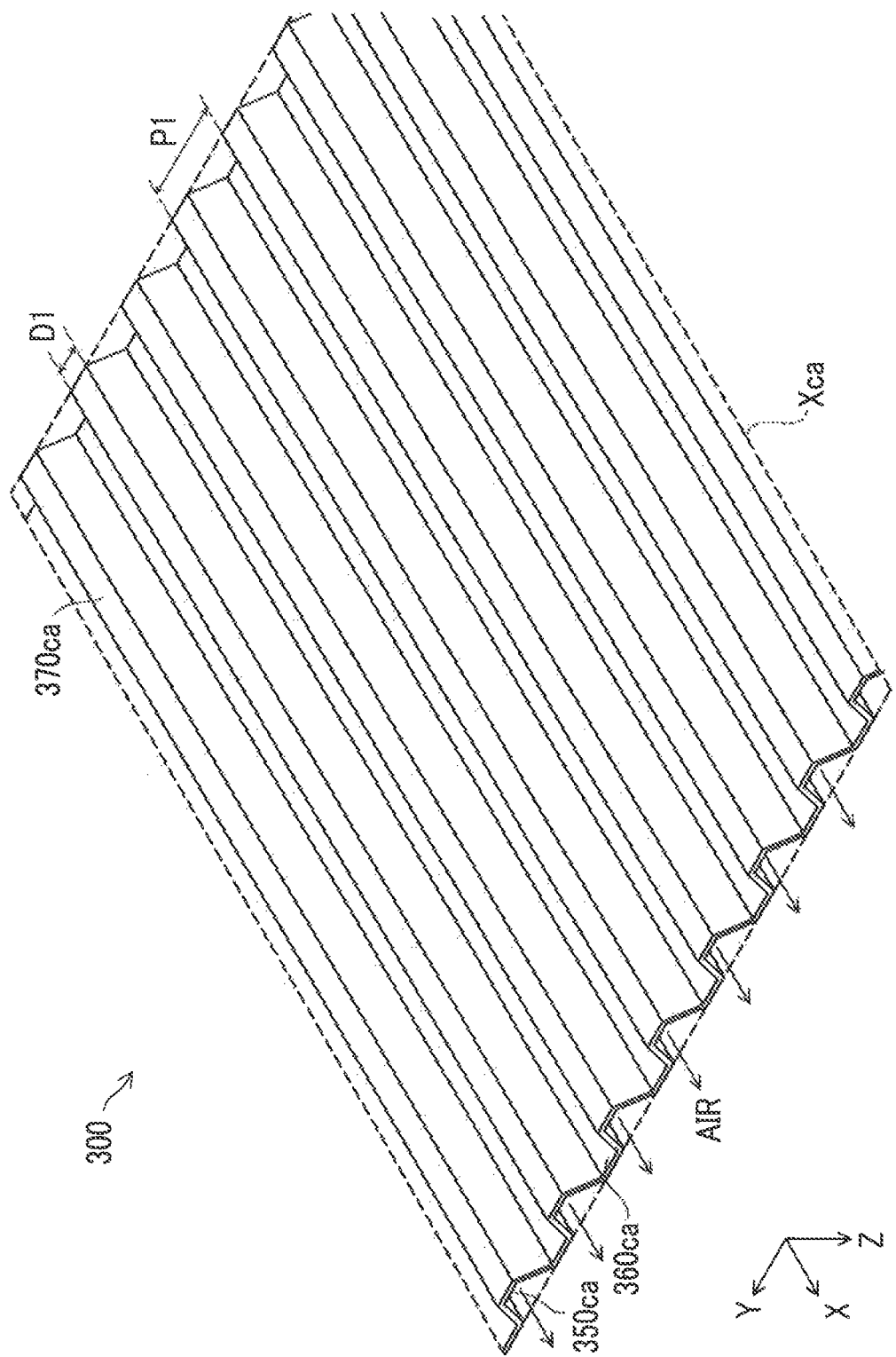
FIG. 3 is a schematic perspective view in which a part of a main channel of a first separator is enlarged.

FIG. 3 is a schematic perspective view in which a part Xca of a central main channel of the first separator 300 in FIG. 2 is enlarged. In a region (FIG. 2) that opposes the membrane-electrode assembly 210 that is a power generation portion, this central main channel is a portion arranged at the center of the groove channel, from which a dividing section and a collecting section arranged in the periphery are excluded. In the central main channel of the first separator 300, the plural first straight groove channels 350*ca*, through which the oxidation gas (the air) flows, are arranged in parallel along the Y-direction (a first in-plane direction) (the first in-plane direction is a perpendicular direction to the first groove channel 350*ca*). Each of the first groove channels 350*ca* extends linearly along the X-direction. An arrangement pitch P1 of the plural first groove channels 350*ca* is expressed by a pitch measured along an arrangement direction Y of the first groove channels 350*ca*. A duty ratio of a rib 370*ca* of the refrigerant groove channel 360*ca* is set to be 20 to 40%. This duty ratio is a ratio of width D1 of the flat section of the rib 370*ca* to the pitch P1 (D1/P1). Note that an uneven shape of a cross section of the first groove channel 350*ca* along the Y-direction can be regarded as a "first uneven shape".

Figure 4:
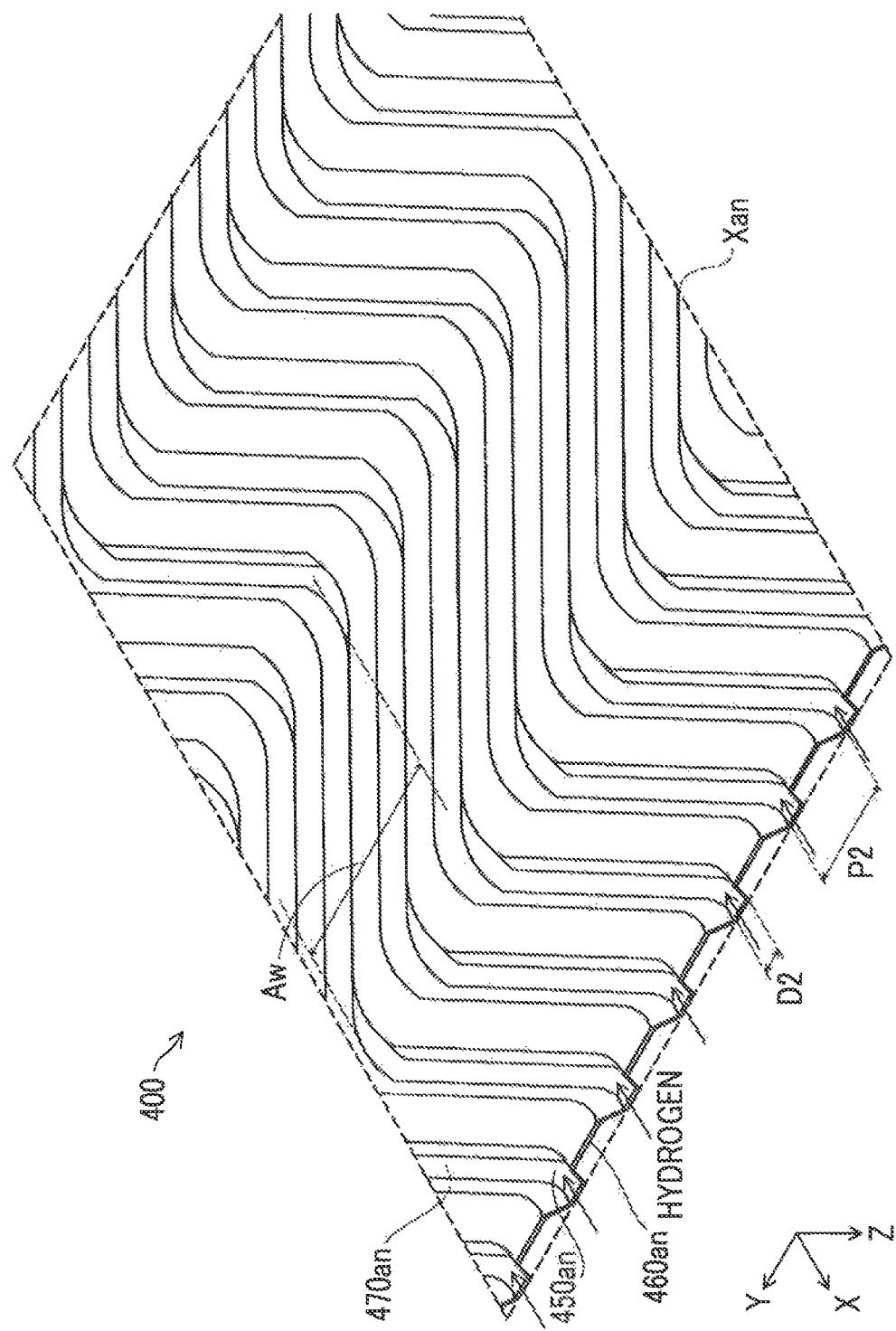
FIG. 4 is a schematic perspective view in which a part of a main channel of a second separator is enlarged.

FIG. 4 is a schematic perspective view in which a part Xan of a central main channel of the second separator 400 in FIG. 2 is enlarged. The central main channel of the second separator 400 is a part that opposes the central main channel of the first separator 300, and the part Xan represents a part that opposes the part Xca of the adjacent first separator 300. In the central main channel of the second separator 400, the plural second wavy groove channels 450*an*, through which the fuel gas (the hydrogen gas) flows, are provided in parallel along the Y-direction (the first in-plane direction). A center of the wavy shape defined by each of the second groove channels 450*an* is parallel with the X-direction, that is, is parallel with a channel direction of the first straight groove channel 350*ca* (FIG. 3). Similar to the pitch P1 of the first groove channel 350*ca*, an arrangement pitch P2 of the plural second groove channels 450*an* is expressed by a pitch measured along the Y-direction. A duty ratio of a rib 470*an* of the refrigerant groove channel 460*an* is also set to be 20 to 40%. This duty ratio is a ratio of width D2 of a flat section of the rib 470*an* to the pitch P2. An amplitude of the second groove channels 450*n*, that is, an amplitude Aw of the wavy ribs 470*an* on the refrigerant groove channel 360*ca* side is an amplitude of the wavy shape defined by the centers of the width of the ribs 470*an* and is a value that follows the Y-direction. Note that man uneven shape of a cross section of the second groove channel 450*an* along the Y-direction can be regarded as a "second uneven shape".

The first pitch P1 of the first groove channel 350*ca* is set to have a different value from the second pitch P2 of the second groove channel 450*an*. In this embodiment, (P2/P1)= 9/8. As will be described below, these pitches P1. P2 preferably satisfy a relationship of 1<(P1/P2)<3/2 or 1<(P2/P1)<3/2. In addition, the amplitude Aw of the second groove channel 450*an* is set in such a magnitude to overlap the rib 370*ca* on the back side of the plural (three in this example) first groove channels 350*ca*. Note that a further description will be made below on the first pitch P1 of the first groove channel 350*ca*, the second pitch P2 of the second groove channel 450*an*, and the amplitude Aw of the second groove channel 450*an*.

Note that, in order to explain a relationship between the first separator 300 and the second separator 400 that are adjacent to each other, the rib 370*ca* on the back side of the first groove channel 350*ca* will also hereinafter be referred to as the "first projection 370*ca*" and the rib 470*an* on the back side of the second groove channel 450*an* will also hereinafter be referred to as the "second projection 470*an*".

Figure 5:
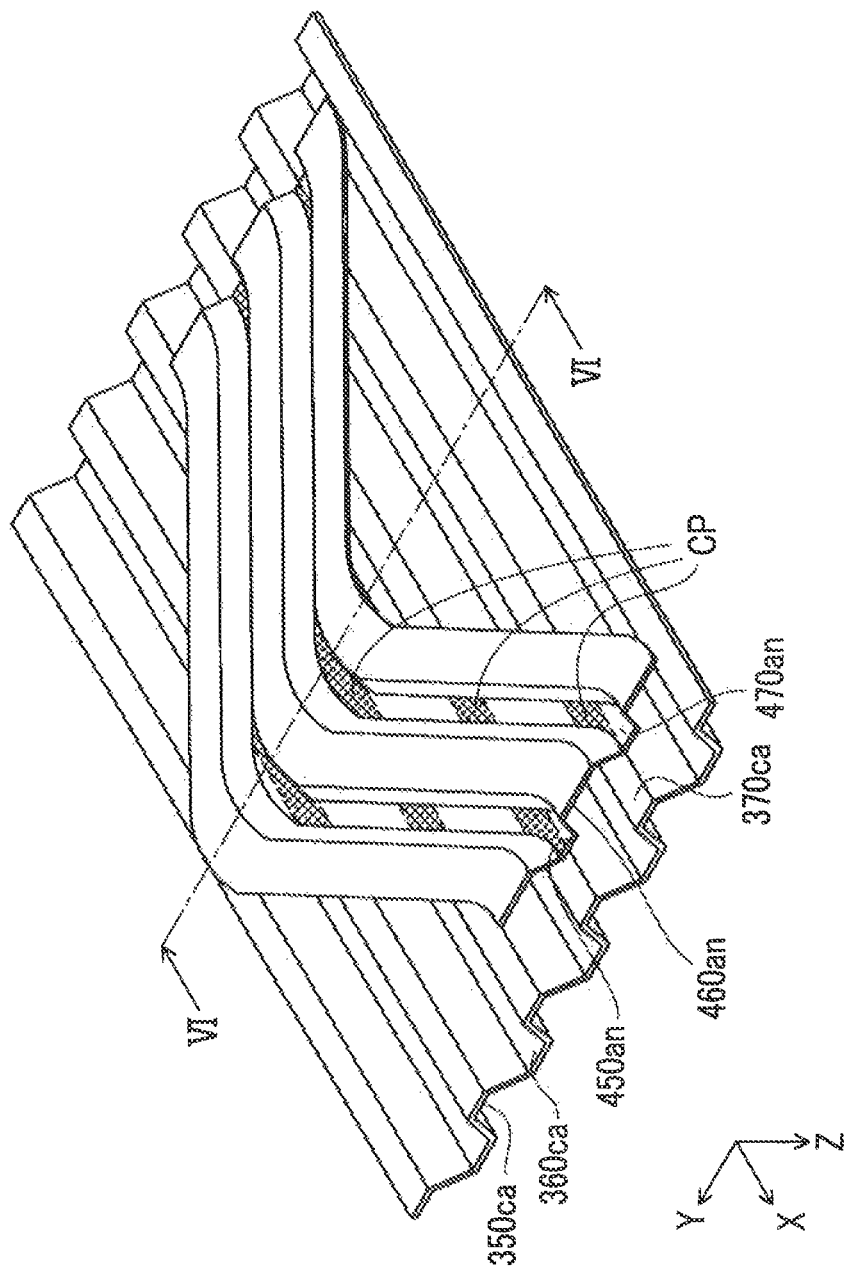
FIG. 5 is a schematic perspective view in which the parts of the main channels of the two separators in adjacent states to each other are enlarged.

FIG. 5 is a schematic perspective view in which parts of the central main channels of the first separator 300 and the second separator 400 in adjacent states to each other are enlarged. In the first separator 300 of the one single cell 100, and the second separator 400 of the other single cell 100*b* that are adjacent to each other, the first projection 370*ca* of the first separator 300 is in contact with the second projection 470*an* of the second separator 400. The one second projection 470*an* is in contact with the plural (three in this example) first projections 370*ca*. Note that hatched parts in FIG. 5 represent contact parts CP.

Figure 6:
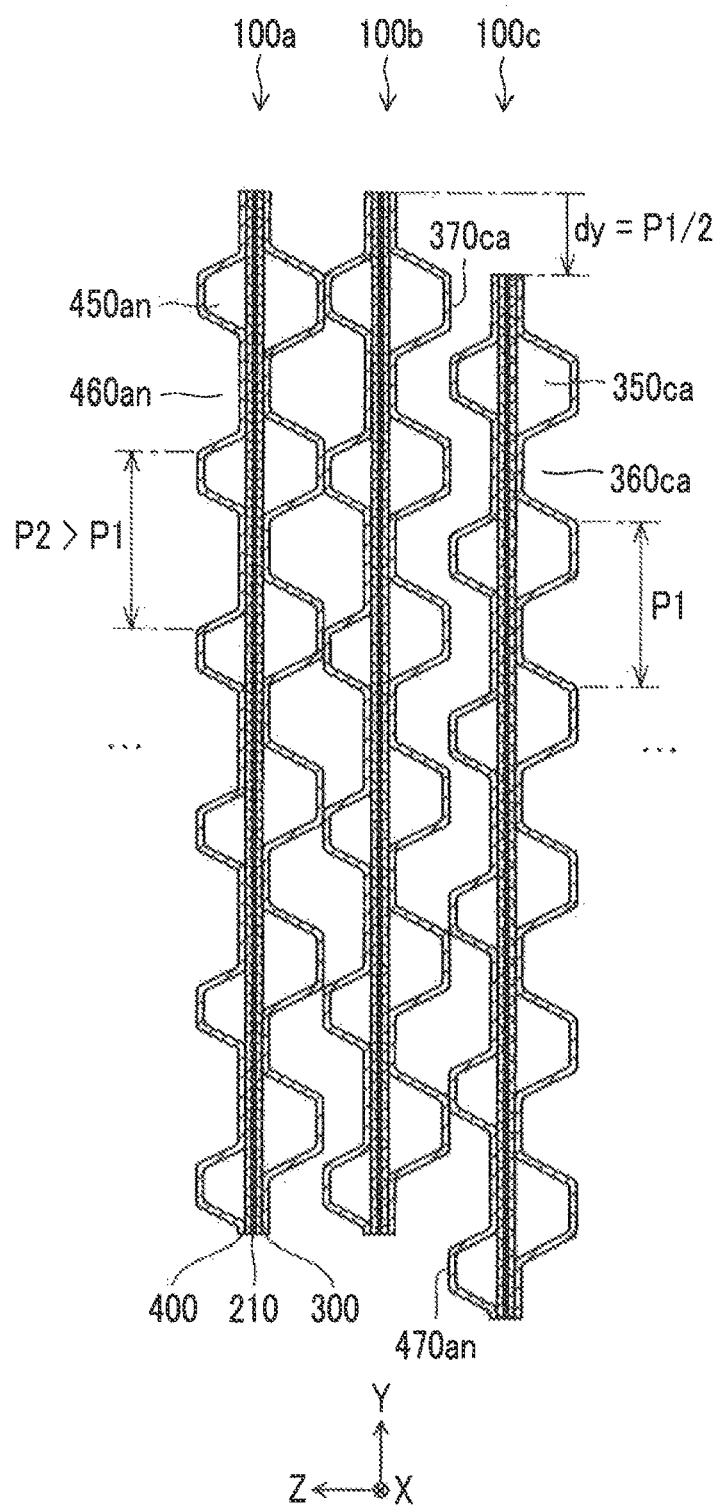
FIG. 6 is a schematic cross-sectional view in which the three single cells that are adjacent to each other are enlarged.

FIG. 6 is a schematic cross-sectional view in which three single cells 100*a*, 100*b*, 100*c* of the plural single cells 100 that constitute the fuel cell stack 10 are enlarged, the three single cells 100*a*, 100*b*, 100*c* being adjacent to each other. FIG. 6 corresponds to a VI-VI cross section in FIG. 5. FIG. 6 shows a situation where the single cell 100*s* and the single cell 100*b* are adjacent to each other in a state with no misalignment, and shows a situation where the single cell 100*c* is adjacent to the single cell 100*b* in a misaligned state in a negative Y-direction. The negative Y-direction means a direction opposite to the Y-direction in FIG. 6. A misalignment amount dy of the two single cells 100*b*, 100*c* is ½ of the first pitch P1 of the first groove channel 350*ca* of the first separator 300.

Figure 7:
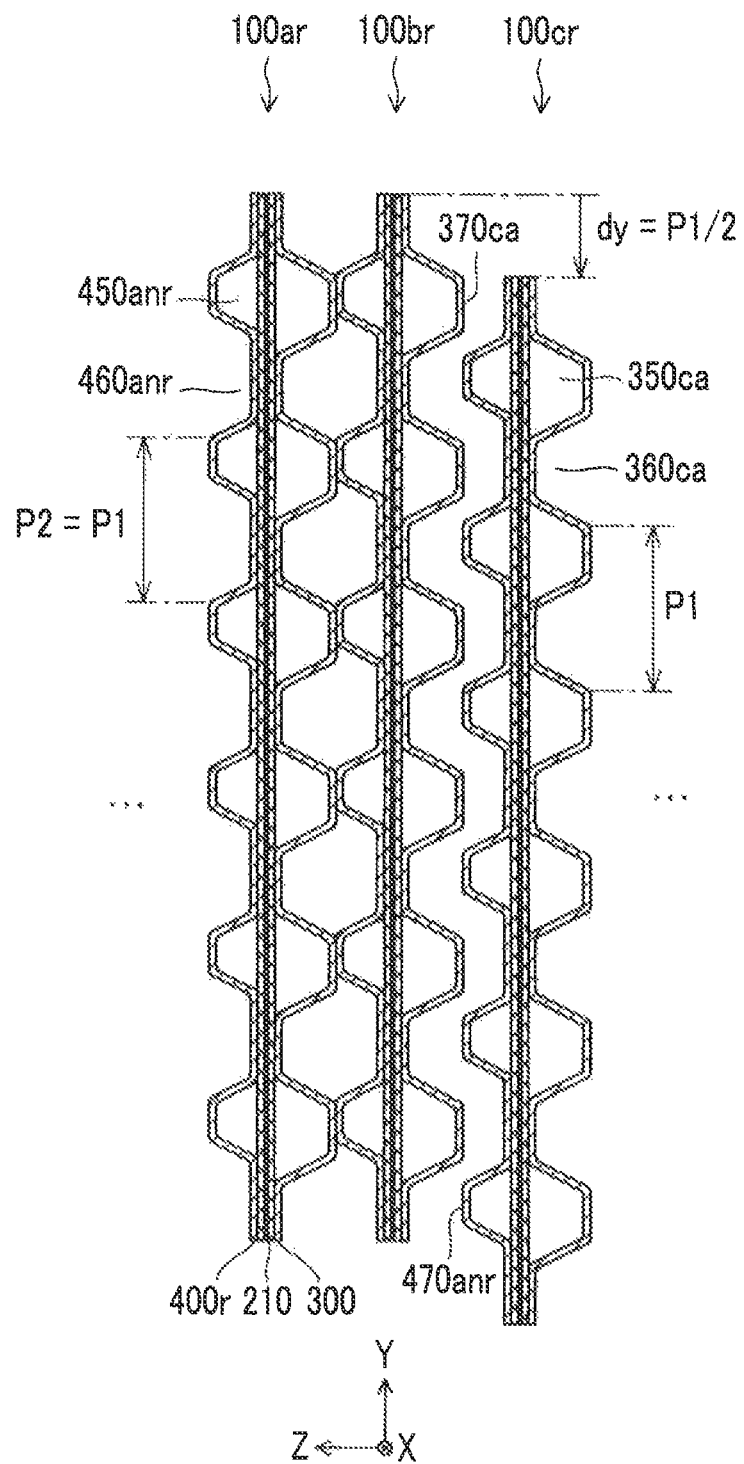
FIG. 7 is a schematic cross-sectional view in which three single cells are enlarged as a comparative example.

FIG. 7 is a schematic cross-sectional view in which three single cells 100*ar*, 100*br*, 100*cr* of plural single cells that constitute a fuel cell stack are enlarged as a comparative example, the three single cells 100*ar*, 100*br*, 100*cr* being adjacent to each other. FIG. 7 is a view that corresponds to FIG. 6, shows a situation where the single cell 100*ar* and the single cell 100*br* are adjacent to each other in states with no misalignment, and shows a situation where the single cell 100*cr* is adjacent to the single cell 100*br* in a state of being misaligned in the negative Y-direction. Similar to the single cell 100c in FIG. 6, the misalignment amount dy of the two single cells 100br, 100cr is ½ of the first pitch P1 of the first groove channel 350ca of the first separator 300.

In the single cells 100ar, 100br, 100cr of the comparative example, the second wavy groove channel 450an and the wavy refrigerant groove channel 460an of the second separator 400 (FIG. 4) in the single cells 100 of the embodiment are replaced with a second groove channel 450anr and a refrigerant groove channel 460anr that are straight as similar to the first groove channel 350ca and the refrigerant groove channel 360ca of the first separator 300 (FIG. 3). The second pitch P2 of the second groove channel 450anr is set to be the same as the first pitch P1 of the first groove channel 350ca.

As shown in FIG. 7, the single cell 100cr is misaligned in the negative Y-direction by the misalignment amount dy of (P1/2). Accordingly, a second projection 470anr of a second separator 400r of the single cell 100cr is positioned to oppose the refrigerant groove channel 360ca of the single cell 100br. Thus, the first projection 370ca of the first separator 300 and the second projection 470anr of the second separator 400r that should contact each other are brought into non-contact states. Consequently, the second projection 470anr is brought into a fitted state to the refrigerant groove channel 360ca, which leads to a problem that structures of the fuel cell stack and the fuel cells (the single cells) become unstable. In addition, in the single cells 100br, 100cr, a difference between distribution of a load that is applied to the membrane-electrode assembly 210 from the first separator 300 holding the membrane-electrode assembly 210 and distribution of a load that is applied to the membrane-electrode assembly 210 from the second separator 400r is increased, unevenness of the loads applied to surfaces of the membrane-electrode assembly 210 is increased to one of the surfaces, and the membrane-electrode assembly 210 is possibly damaged.

On the other hand, in the embodiment, as shown in FIG. 6, the second pitch P2 of the second groove channel 450an of the second separator 400 differs from the first pitch P1 of the first groove channel 350ca of the first separator 300 as described above, and neither P1/P2 nor P2/P1 has an integral value. Accordingly, as shown in FIG. 6, in the single cells 100a, 100b, the second projections 470an of the second separator 400 in the single cell 100b are dislocated with respect to the first projections 370ca of the first separator 300 in the single cell 100a, and positions where the second projections 470an respectively contact the first projections 370ca are changed. Thus, as in the single cell 100c, even when the second projections 470an are dislocated by the misalignment amount dy of (P1/2) in the negative Y-direction, the second projections 470an of the second separator 400 in the single cell 100c can respectively contact the first projections 370ca of the first separator 300 in the single cell 100b. In addition, in the single cells 100b, 100c, the difference between the distribution of the load that is applied to the membrane-electrode assembly 210 from the first separator 300 holding the membrane-electrode assembly 210 and the distribution of the load that is applied to the membrane-electrode assembly 210 from the second separator 400 can be suppressed, the unevenness of the loads applied to one of the surfaces of the membrane-electrode assembly 210 can be suppressed, and thus the damage to the membrane-electrode assembly 210 can be suppressed.

Furthermore, as shown in FIG. 4 and FIG. 5, the second groove channel 450an of the second separator 400 is configured as the wavy groove channel with the amplitude Aw in such a magnitude that the second projection 470an overlaps the plural (three in this example) first projections 370ca with respect to the first straight groove channel 350ca of the first separator 300. Also, with such a configuration, stability of a contact structure of the adjacent separators can be improved, and thus stability of a structure of the fuel cell stack can be improved.

Figure 8:
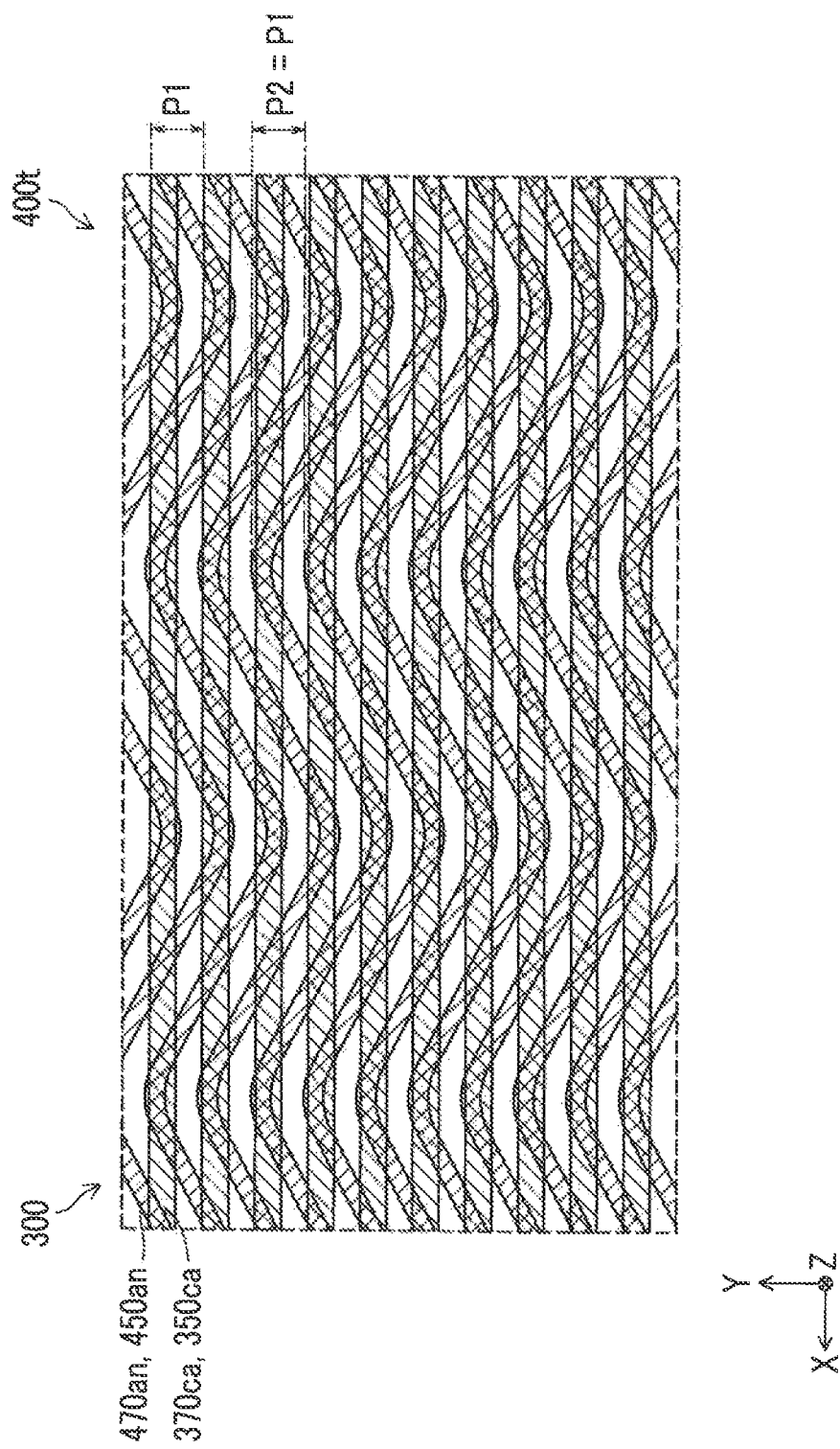
FIG. 8 is a schematic view of parts of first straight projections and second wavy projections that are adjacent to each other in another comparative example.

FIG. 8 is a schematic view of parts of the first straight projections 370ca of the first separator 300 and parts of the second wavy projections 470an of a second separator 400t that are adjacent to each other in another comparative example. FIG. 8 shows a state where the second pitch P2 of the second projection 470an (the second groove channel 450an) is equal to the first pitch P1 of the first projection 370ca (the first groove channel 350ca). In FIG. 8, for simplification of the illustration and the description, inclinations of the grooves and the ribs are not shown, parts corresponding to the flat sections of the first projection 370ca are each hatched obliquely upward to the right, and parts corresponding to the flat sections of the second projections 470an are each hatched obliquely downward to the right.

Figure 9:
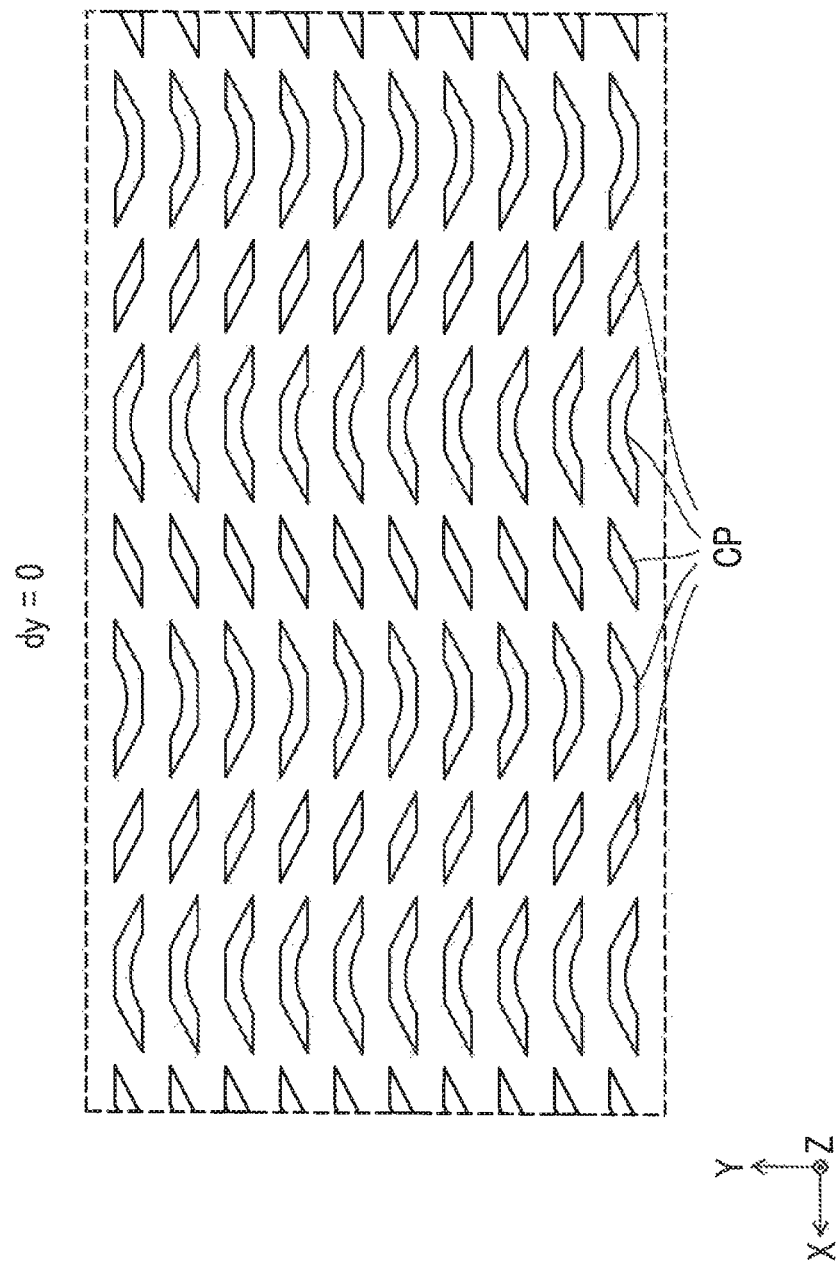
FIG. 9 is a view that illustrates contact parts in the case where a misalignment amount dy is 0 in the comparative example of FIG. 8.
Figure 10:
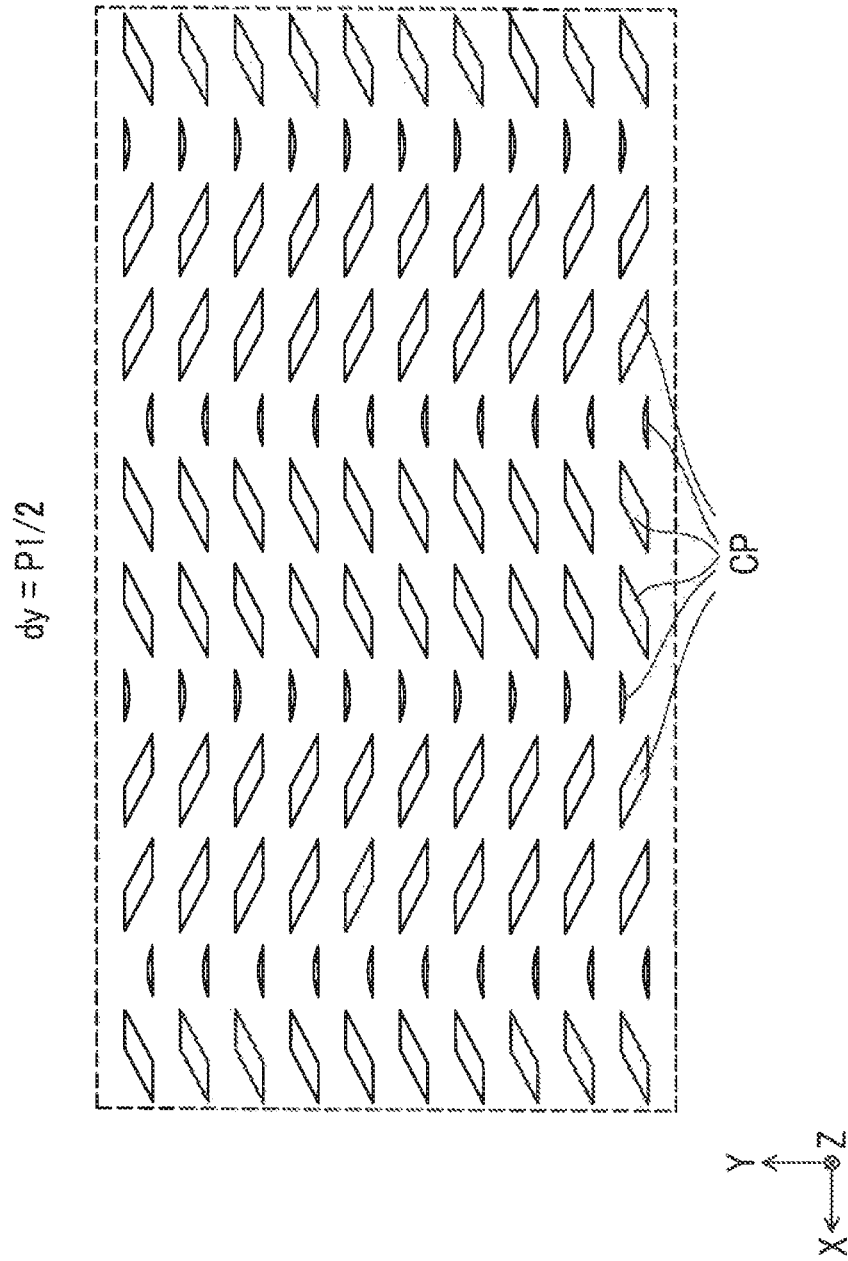
FIG. 10 is a view that illustrates the contact parts in the case where the misalignment amount dy is (P1/2) in the comparative example of FIG. 8.

FIG. 9 is a view that illustrates the contact parts CP between the first projections 370ca and the second projections 470an in the case where the misalignment amount dy of the adjacent single cells is 0 in the comparative example of FIG. 8. FIG. 10 is a view that illustrates the contact parts CP between the first projections 370ca and the second projections 470an in the case where the misalignment amount dy is (P1/2) in the comparative example of FIG. 8. Note that, in regard to the misalignment amount dy, the misalignment in the negative Y-direction is indicated as that in a positive direction.

In the cases where the second pitch P2 of the second projection 470an (the second groove channel 450an) is in the state equal to the first pitch P1 of the first projection 370ca (the first groove channel 350ca) (FIG. 8) and the misalignment of the stack occurs in the Y-direction, the first projections 370ca and the second projections 470an are never brought into a completely non-contact state, differing from the case of the straight groove channels shown in FIG. 7. However, as it is understood from a comparison between FIG. 9 and FIG. 10, the state (the position, the shape, an area, and the like) of the contact part CP is significantly changed in accordance with the position thereof in the X-direction, which leads to a change in the distribution of the load in the surfaces of the adjacent separators in accordance with this change. Accordingly, a difference occurs between the distribution of the load between the single cells with no misalignment and the distribution of the load between the misaligned single cells, and the structure of the fuel cell stack possibly becomes unstable. In addition in the misaligned single cells, the structure of the single cell possibly becomes unstable due to the difference between the distribution of the load that is applied to the membrane-electrode assembly 210 from the side of the one separator 300 holding the membrane-electrode assembly 210 and the distribution of the load that is applied to the membrane-electrode assembly 210 from the side of the other separator 400t Furthermore, due to the difference between the distribution of the load that is applied to the membrane-electrode assembly 210 from the side of the one separator 300 holding the membrane-electrode assembly 210 and the distribution of the load that is applied to the membrane-electrode assembly 210 from the side of the other separator 400t, the load that is unevenly applied to one of the surfaces of the membrane-electrode assembly 210 is increased, and the membrane-electrode assembly 210 is possibly damaged.

Figure 11:
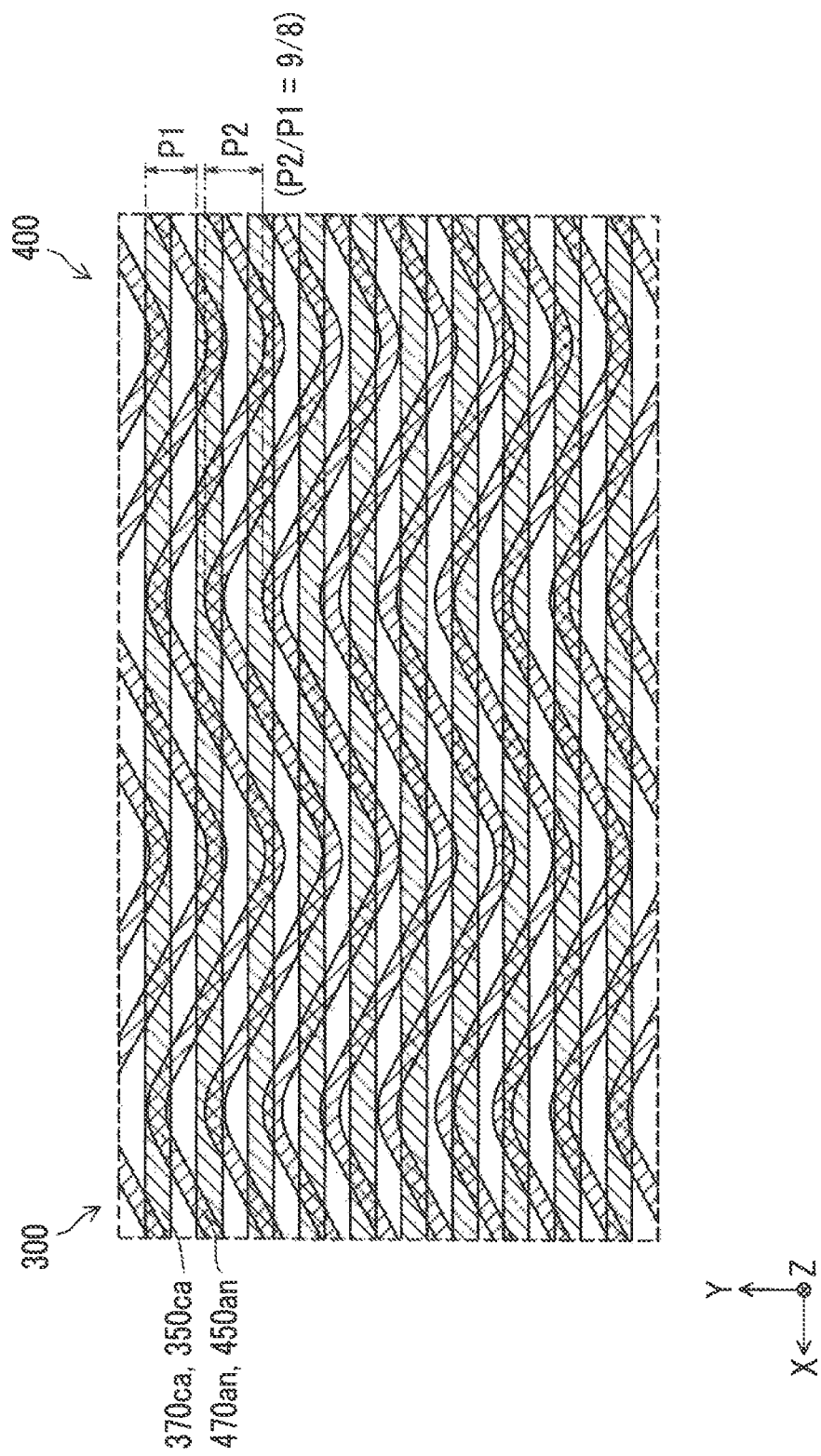
FIG. 11 is a schematic view of parts of the first straight projections and second wavy projections that are adjacent to each other as an embodiment.

FIG. 11 is a schematic view of parts of the first straight projections 370*ca* of the first separator 300 and the second wavy projections 470*an* of the second separator 400 that are adjacent to each other as an embodiment FIG. 11 corresponds to FIG. 8. As described above, FIG. 11 shows a state where the second pitch P2 of the second projection 470*an* (the second groove channel 450*an*) is larger than the first pitch P1 of the first projection 370*ca* (the first groove channel 350*ca*) and (P2/P1)=9/8.

Figure 12:
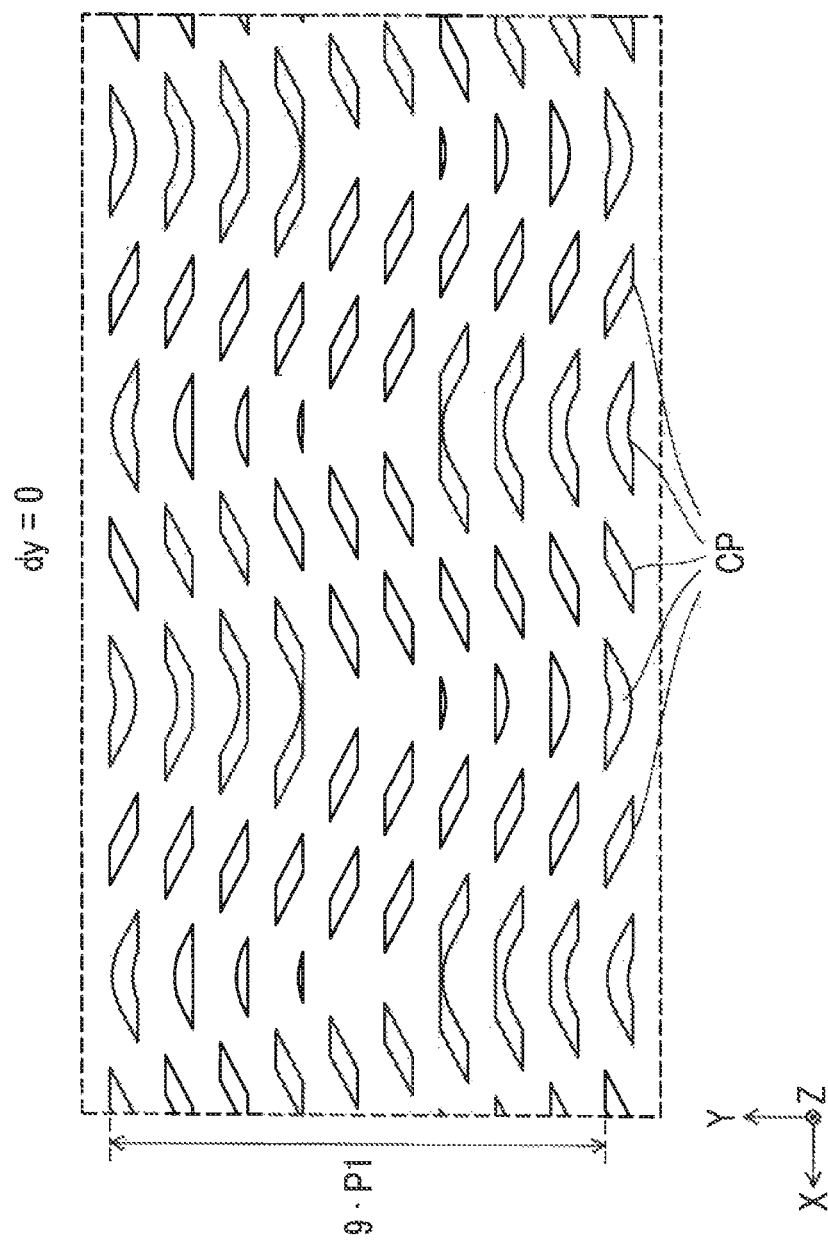
FIG. 12 is a view that illustrates the contact parts in the case where the misalignment amount dy is 0 in the embodiment of FIG. 11.
Figure 13:
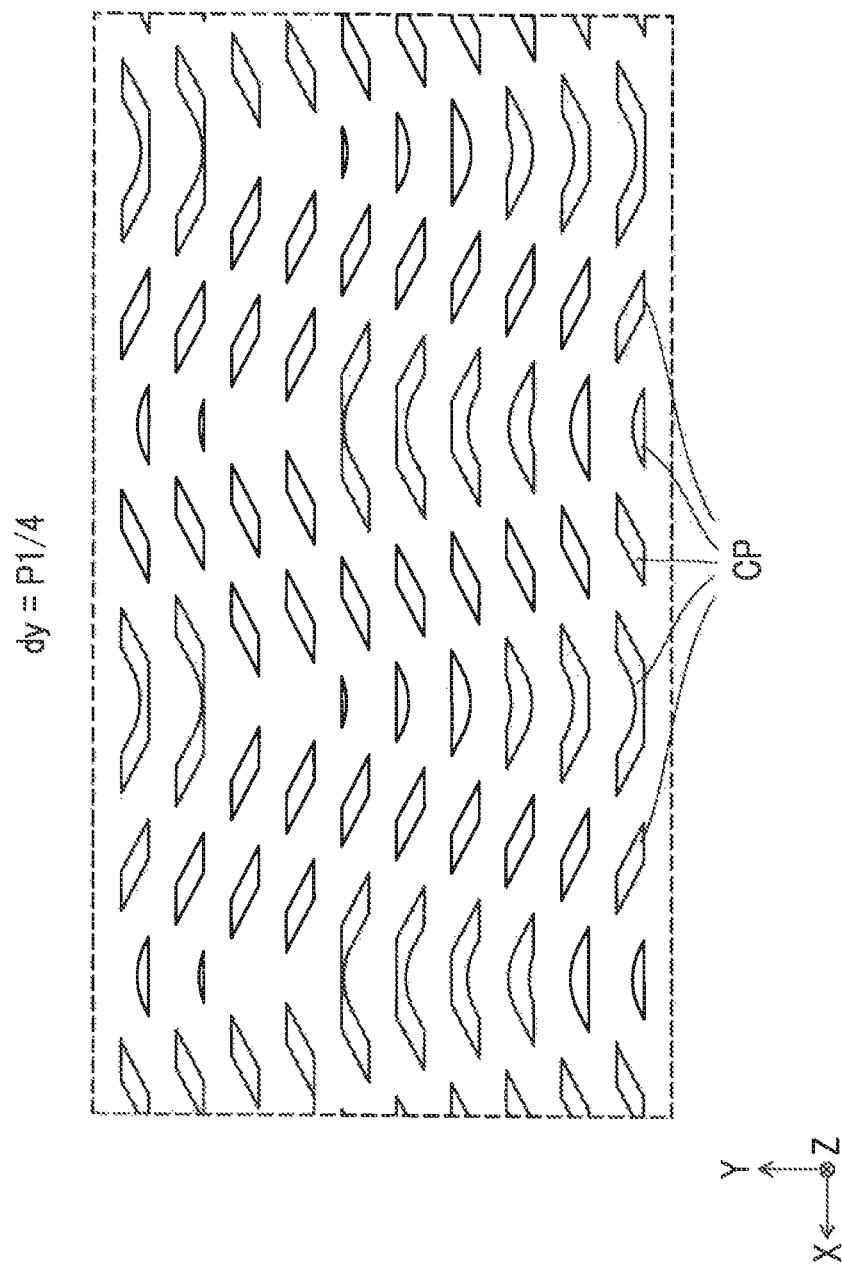
FIG. 13 is a view that illustrates the contact parts in the case where the misalignment amount dy is (P1/4) in the embodiment of FIG. 11.
Figure 14:
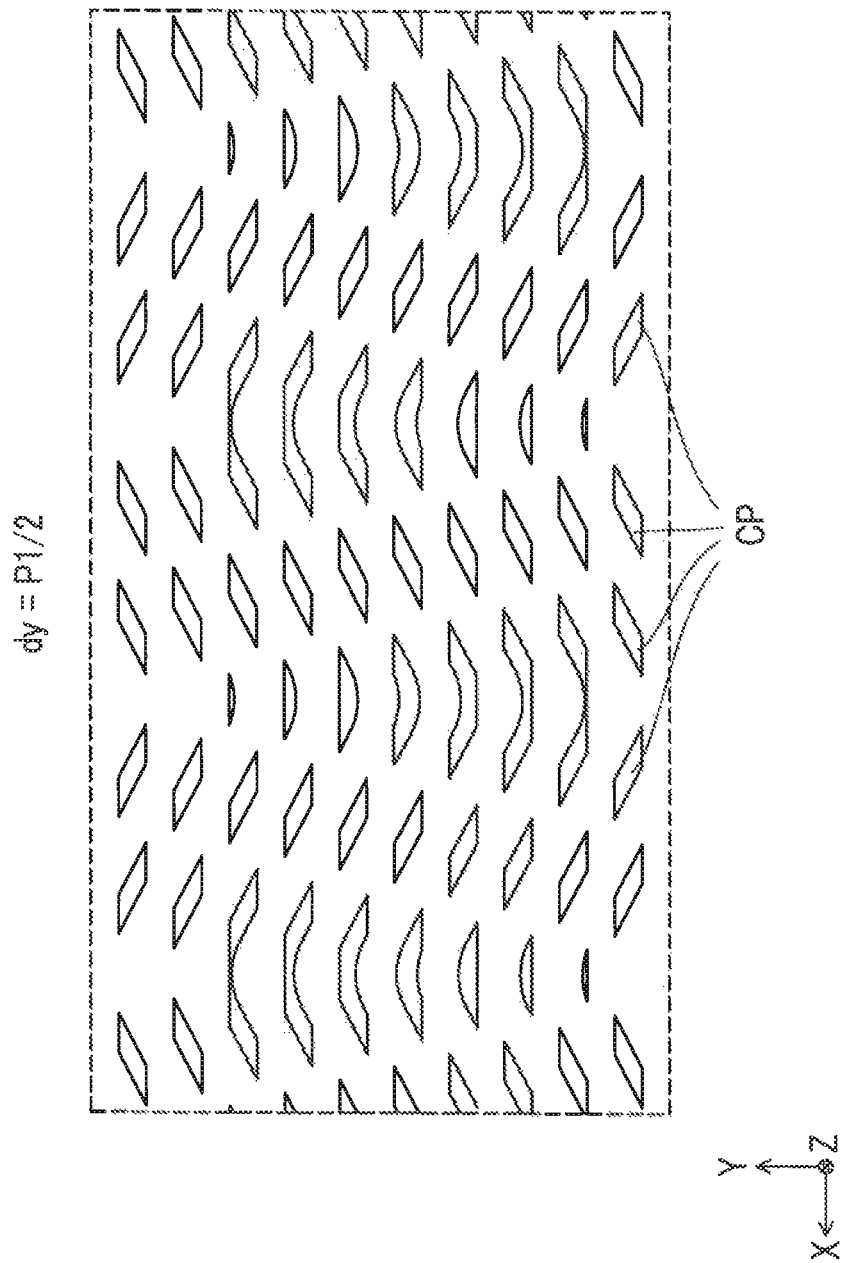
FIG. 14 is a view that illustrates the contact parts in the case where the misalignment amount dy is (P1/2) in the embodiment of FIG. 11.

FIG. 12 is a view that illustrates the contact parts CP between the first projections 370*ca* and the second projections 470*an* in the case where the misalignment amount dy of the adjacent single cells is 0 in the embodiment of FIG. 11. FIG. 13 is a view that illustrates the contact parts CP of the first projections 370*ca* and the second projections 470*an* in the case where the misalignment amount dy is (P1/4) in the embodiment of FIG. 11. FIG. 14 is a view that illustrates the contact parts CP of the first projections 370*ca* and the second projections 470*an* in the case where the misalignment amount dy is (P1/2) in the embodiment of FIG. 11.

In the state of (P2/P1)=9/8 (FIG. 11), as shown in FIG. 12, the states of the contact parts CP in a plane along an XY plane where the separators contact each other are gradually changed along the Y-direction at positions in the X-direction in accordance with the pitch difference determined by (P2/P1). In this example, a change pattern is repeated at every pitch interval (9·P1) of the first projection 370*ca* (the first groove channel 350*ca*). As shown in FIG. 13 and FIG. 14, despite differences in the shapes and the positions in the Y-direction of the contact parts CP, even when the stack is misaligned in the Y-direction, the states of these contact part CP are similarly and gradually changed along the Y-direction in accordance with the pitch difference determined by (P2/P1), and the change pattern is repeated at every pitch interval (9·P1). Accordingly, in the case of the embodiment, the difference between the distribution of the load between the single cells with no misalignment and the distribution of the load between the misaligned single cells can be suppressed, and the structure of the fuel cell stack can be suppressed from becoming unstable. In addition, in the misaligned single cells, the structure of the single cell can be suppressed from becoming unstable due to the difference between the distribution of the load that is applied to the membrane-electrode assembly 210 from the side of the one separator 300 holding the membrane-electrode assembly 210 and the distribution of the load that is applied to the membrane-electrode assembly 210 from the side of the other separator 400. Furthermore, due to the difference between the distribution of the load that is applied to the membrane-electrode assembly 210 from the side of the one separator 300 holding the membrane-electrode assembly 210 and the distribution of the load that is applied to the membrane-electrode assembly 210 from the side of the other separator 400, the load that is unevenly applied to one of the surfaces of the membrane-electrode assembly 210 can be suppressed, and thus the damage to the membrane-electrode assembly 210 can be suppressed.

The misalignment of the stack of the single cells has been described above. However, even when misalignment of the paired separators constituting the single cell occurs, the unevenness of the loads applied to one of the surfaces of the membrane-electrode assembly, which is caused by the difference between the distribution of the load applied to the membrane-electrode assembly from the one separator holding the membrane-electrode assembly and the distribution of the load applied to the membrane-electrode assembly from the other separator, can similarly be suppressed. Thus, the damage to the membrane-electrode assembly can be suppressed.

In the above embodiment, the description has been made by using (P2/P1)=9/8. However, the disclosure is not limited thereto. The first pitch P1 of the first groove channel 350*ca* and the second pitch P2 of the second groove channel 450*an* may have different values from each other, and neither the value of P1/P2 nor the value of P2/P1 may have the integral value. Furthermore, it is preferred to satisfy 1<(P1/P2)<3/2 or 1<(P2/P1)<3/2. In this way, regardless of presence or absence of the misalignment of the stack, the states of the contact parts CP in the plane along the XY plane of the adjacent separators 300, 400 can gradually be changed along the Y-direction at each of the positions in the X-direction in accordance with the pitch difference determined by (P2/P1) or (P1/P2). Accordingly, the difference between the distribution of the load between the single cells with no misalignment and the distribution of the load between the misaligned single cells can be suppressed, and the structure of the fuel cell stack can be suppressed from becoming unstable. In addition, in the misaligned single cells, the structure of the single cell can be suppressed from becoming unstable due to the difference between the distribution of the load that is applied to the membrane-electrode assembly 210 from the side of the one separator 300 holding the membrane-electrode assembly 210 and the distribution of the load that is applied to the membrane-electrode assembly 210 from the side of the other separator 400. Furthermore, due to the difference between the distribution of the load that is applied to the membrane-electrode assembly 210 from the side of the one separator 300 holding the membrane-electrode assembly 210 and the distribution of the load that is applied to the membrane-electrode assembly 210 from the side of the other separator 400, the load that is unevenly applied to one of the surfaces of the membrane-electrode assembly 210 can be suppressed, and thus the damage to the membrane-electrode assembly 210 can be suppressed.

Note that a reason why neither the value of P1/P2 nor the value of P2/P1 has the integral value is to avoid a state where the first groove channel 350*ca* matches the second groove channel 450*an* in the arrangement direction (the Y-direction) as much as possible. In addition, when it is set (P1/P2)>3/2 or (P2/P1)>2/3, the misalignment amount of each pair of the contact surfaces of the separators in a misaligned direction is reduced, and the state where the first groove channel 350*ca* matches the second groove channel 450*an* in the arrangement direction (the Y-direction) is further efficiently avoided.

Here, the air supplied as the oxidation gas only contains 20% of oxygen that is actually used for the electrochemical reaction to generate the power, and a sufficient supply amount of the air as the oxidation gas has to be secured in order to secure power generation capacity. In addition, normally, the supplied fuel gas is the hydrogen gas that is used for the electrochemical reaction. And, supply efficiency of the hydrogen gas through the second groove channel 450*an* is higher than supply efficiency of the oxidation gas therethrough. Accordingly, in order to secure the sufficient supply amount of the oxidation gas, it is desired to configure the first groove channel 350*ca* as the straight groove channel and prioritize a reduction in pressure loss of the oxidation gas in the first groove channel 350*ca*. Furthermore, it is desired to change the second pitch P2 of the second groove channel 450*an* with respect to the first pitch P1 of the first grove channel 350*ca* being a reference from a design perspective. Moreover, compared to a case where the second pitch P2 of the second groove channel 450*an* is reduced, manufacturing of the second separator 400 is facilitated by increasing the second pitch P2 of the second groove channel 450*an* when accuracy of manufacturing thereof is taken into consideration. Thus, it is actually desired to increase the second pitch P2 of the second groove channel 450*an* with the first pitch P1 of the first groove channel 350*ca* being the reference.

In the above embodiment, the amplitude Aw (FIG. 4) of the second grove channel 450*an* is set to such a magnitude that the rib 470*an* (the second projection 470*an*) on the back side of the second groove channel 450*an* overlaps the ribs 370*ca* (the first projections 370*ca*) on the back side of the plural (three in this example) first groove channels 350*ca*. This amplitude Aw is preferably set as follows.

In the cases where the amplitude Aw is reduced and the number of the second projections 470*an* (FIG. 11) that overlap the first projections 370*ca* is reduced, the number of the first projections 370*ca* that contact the second projections 470*an* is reduced. Accordingly, stability of the contact structure of the adjacent separators is degraded, and the stability of the structure of the fuel cell stack is degraded. On the contrary, in the cases where the amplitude Aw is increased and the number of the second projections 470*an* that overlap the first projections 370*ca* is increased, the number of the first projections 370*ca* that contact the second projections 470*an* is increased. Accordingly, the stability of the contact structure of the adjacent separators is improved, and the stability of the structure of the fuel cell stack is improved. However, in this case, each of the groove channels significantly meanders, and channel length thereof is increased. As a result, pressure loss of the fuel gas in the second groove channel 450*an* is increased, and the supply efficiency of the fuel gas is degraded. Accordingly, the amplitude Aw of the second groove channel 450*an* is preferably set to such a magnitude that both of the stability of the contact structure and suppression of the pressure loss can be realized, and the second projection 470*an* is preferably set in such size to overlap the three or four first projections 370*ca*. More specifically, the amplitude Aw is preferably set as follows.

Figure 15:
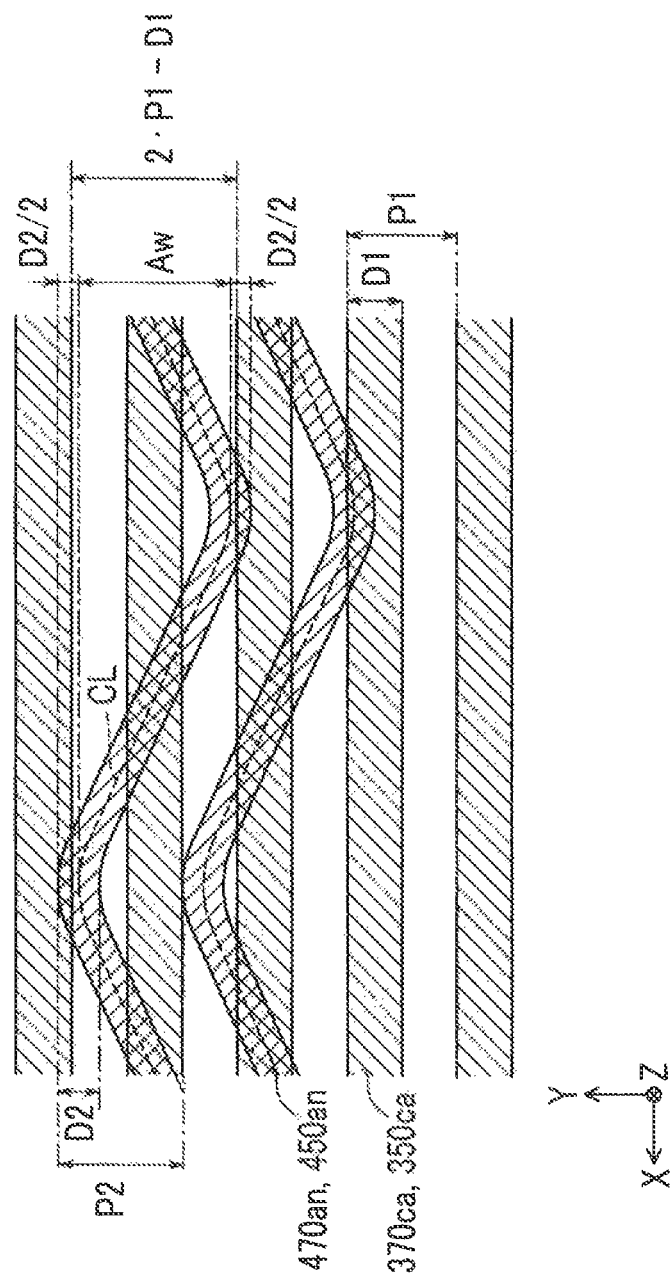
FIG. 15 is a view that illustrates a lower limit of an amplitude of the second groove channel.
Figure 16:
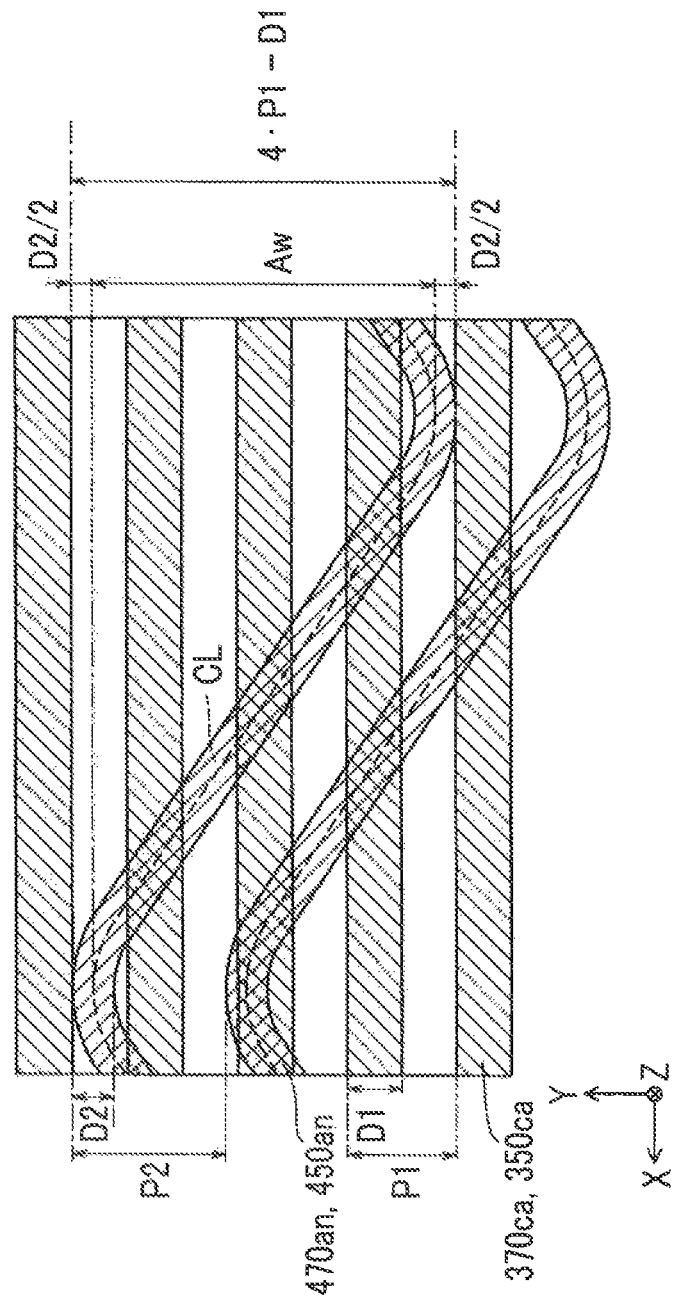
FIG. 16 is a view that illustrates an upper limit of the amplitude of the second groove channel.

FIG. 15 is a view that illustrates a lower limit of the amplitude Aw of the second groove channel 450*an*. FIG. 16 is a view that illustrates an upper limit of the amplitude Aw of the second groove channel 450*an*. The pitch of the second groove channel 450*an* (the second projection 470*an*) is set as P2, and the width of the flat section of the second projection 470*an* is set as D2. The pitch of the first groove channel 350*ca* (the first projection 370*ca*) is set as P1, and the width of the flat section of the first projection 370*ca* is set as D1. As the amplitude of the second groove channel 450*an*, an amplitude of a broken line shape at a center CL of the width of the second projection 470*an* is set as Aw.

As shown in FIG. 15, in order to make the second wavy projection 470*an* overlap the three or more first straight projections 370*ca*, the following equation (2) has to be satisfied.

$$(D2/2)+Aw+(D2/2)>(2 \cdot P1)-D1 \quad (2)$$

Then, by modifying the above equation (2), the lower limit of the amplitude Aw is set as expressed by the following equation (3).

$$Aw>(2 \cdot P1)-(D1+D2) \quad (3)$$

As shown in FIG. 16, in order to make the second wavy projection 470*an* overlap the less than five (four or less) first straight projections 370*ca*, the following equation (4) has to be satisfied.

$$(D2/2)+Aw+(D2/2)<(4 \cdot P1)-D1 \quad (4)$$

Then, by modifying the above equation (4), the upper limit of the amplitude Aw is set as expressed by the following equation (5).

$$Aw<(4 \cdot P1)-(D1+D2) \quad (5)$$

When the amplitude Aw of the second groove channel 450*an* (the second projection 470*an*) is set to satisfy the above equation (3) and the above equation (5), the second projection 470*an* can overlap the three or four first projections 370*ca*. In this way, the pressure loss of the fuel gas in the second groove channel 450*an* is set appropriately, and the number of the contact parts CP between the second projections 470*an* and the first projections 370*ca* is set appropriately. In this way, the contact structure of the adjacent separators can be stabilized, and the structure of the fuel cell stack can be stabilized.

B. Modified Examples

Note that the disclosure is not limited to the above examples and the above embodiments, but can be implemented in various aspects within the scope that does not depart from the gist thereof, and the following modifications are possible, for example.

(1) In the above embodiment, the description has been made on the case where the adjacent single cells 100 are misaligned in the Y-direction (the first in-plane direction) in the plane along the XY plane where the adjacent single cells 100 contact each other. However, a similar effect can be obtained in the case where the adjacent single cells 100 are misaligned in the X-direction and the case where the adjacent single cells 100 are misaligned in the X-direction and the Y-direction.

(2) In the central main channel (FIG. 3), the description has been made that the first straight groove channels 350*ca* of the first separator 300 in the above embodiment are the straight groove channels, each of which is held between the ribs. However, some of that the first groove channels may each have a bent section or a throttle section. In addition, in the above embodiment, the description has been made with the structures of the groove channels in the central main channels (FIG. 2, FIG. 3, and FIG. 4) of the adjacent separators 300, 400 as the examples. However, the structure of the groove channel that has been described in the embodiment can be applied to any part of the plane where the channels of the separators 300, 400 are formed.

(3) In the above embodiment, the description has been made on the case where the first groove channels 350*ca* of the separator 300 on the cathode side are the straight groove channels (FIG. 3) and the second groove channels 450*an* of the separator 400 on the anode side are the wavy groove channels (FIG. 4) as the example. However, the groove channels of the separator 300 on the cathode side may be the wavy groove channels, and the groove channels of the separator 400 on the anode side may be the straight groove channels. In addition, both of the groove channels of the separator 300 on the cathode side and the separator 400 on the anode side may be the wavy groove channels.

(4) In the above embodiment, the description has been made on the separators 300, 400 (FIG. 3 and FIG. 4) that have the uneven shapes in which the ribs (the projections), two each of which hold the refrigerant groove channel are provided on the back side of the grooves of the groove channels for the reaction gas and that establish the relationship of two sides of the same coin as the example. However, the structure of the groove channels that has been described in the embodiment can also be applied to a case where the separators do not establish the relationship of two sides of the same coin and the independent groove channels are respectively formed on the reaction gas side and the cooling medium side as in the separators, each of which is molded by using a carbon member such as dense carbon formed by compressing the carbon particles to make the gas impermeable, for example.

The disclosure is not limited to the embodiments, the examples, and the modified examples that have been described above and can be realized in various configurations within the scope that does not depart from the gist thereof. For example, technical characteristics of the embodiments, the examples, and the modified examples that correspond to technical characteristics in aspects described in SUMMARY can appropriately be replaced or combined to solve a part or al of the above-described problems or to achieve a part of all of the above-described effects. In addition, when any of those technical characteristics is not described as being essential in this specification, the technical characteristic(s) can appropriately be eliminated.

What is claimed is:

1. A single cell of a fuel cell for constituting a stack, the single cell comprising:
    a membrane-electrode assembly; and
    a first separator and a second separator holding the membrane-electrode assembly therebetween, wherein
    the first separator has plural first groove channels that are straight or wavy and that are arranged in parallel to each other in a first in-plane direction,
    a cross section along the first in-plane direction of each of the plural first groove channels has a first uneven shape,
    the first uneven shape has a first pitch P1 along the first in-plane direction,
    the second separator has plural second groove channels that are wavy and that are arranged along the first in-plane direction,
    a cross section along the first in-plane direction of each of the plural second groove channels has a second uneven shape,
    the second uneven shape has a second pitch P2 along the first in-plane direction,
    the first pitch P1 and the second pitch P2 differ from each other and neither a value of P1/P2 nor a value of P2/P1 is an integer, and
    a pattern of the plural first groove channels differs from a pattern of the plural second groove channels such that the first separator and second separator are asymmetrical with respect to the membrane-electrode assembly.

2. The single cell of the fuel cell according to claim 1, wherein
    the plural first groove channels and the plural second groove channels are formed in a region opposing the membrane-electrode assembly.

3. The single cell of the fuel cell according to claim 1, wherein
    the first pitch P1 and the second pitch P2 satisfy $1 < P1/P2 < 3/2$ or $1 < P2/P1 < 3/2$.

4. The single cell of the fuel cell according to claim 1, wherein
    each of the plural first groove channels is a straight groove channel.

5. The single cell of the fuel cell according to claim 4, wherein
    in a case where width of a flat section of a first projection on a back side of the first groove channel is set as D1, an amplitude of a wavy shape of a second projection on a back side of the second groove channel is set as Aw, and width of a flat section of the second projection is set as D2, the amplitude Aw is set to satisfy a relationship expressed by an equation (1) below,
    $$2 \cdot P1 - (D1 + D2) < Aw < 4 \cdot P1 - (D1 + D2) \quad (1)$$

6. The single cell of the fuel cell according to claim 4, wherein
    the first groove channel of the first separator is a channel configured to supply oxidation gas to a cathode of the membrane-electrode assembly, and
    the second groove channel of the second separator is a channel configured to supply fuel gas to an anode of the membrane-electrode assembly.

7. The single cell of the fuel cell according to claim 1, wherein
    the first in-plane direction is a perpendicular direction to the first groove channel.

* * * * *